(12) United States Patent
Robinson et al.

(10) Patent No.: US 8,844,201 B2
(45) Date of Patent: Sep. 30, 2014

(54) HINGED GATE WITH LATCH

(71) Applicants: Joshua A. Robinson, Loveland, CO (US); Kirk A. Robinson, Loveland, CO (US)

(72) Inventors: Joshua A. Robinson, Loveland, CO (US); Kirk A. Robinson, Loveland, CO (US)

(73) Assignee: Gator Kennels LLC, Loveland, CO (US)

( * ) Notice: Subject to any disclaimer, the term of this patent is extended or adjusted under 35 U.S.C. 154(b) by 0 days.

(21) Appl. No.: 13/786,174

(22) Filed: Mar. 5, 2013

(65) Prior Publication Data

US 2013/0227892 A1 Sep. 5, 2013

Related U.S. Application Data

(60) Provisional application No. 61/606,550, filed on Mar. 5, 2012.

(51) Int. Cl.
| | | |
|---|---|---|
| *E05B 65/06* | (2006.01) | |
| *E04H 17/22* | (2006.01) | |
| *E04H 17/16* | (2006.01) | |
| *E05D 7/12* | (2006.01) | |

(52) U.S. Cl.
CPC *E05D 7/12* (2013.01); *E04H 17/22* (2013.01); *E05D 2007/126* (2013.01); *E04H 17/168* (2013.01)

USPC .................. 49/394; 49/395; 49/400; 49/401; 292/137; 292/145; 292/32

(58) Field of Classification Search
USPC ............ 49/381, 394, 395, 400, 401, 50, 501; 16/268, 229–231; 119/484; 292/32, 33, 292/42, 137, 138, 145, DIG. 29 I
See application file for complete search history.

(56) References Cited

U.S. PATENT DOCUMENTS

| | | | | |
|---|---|---|---|---|
| 21,939 | A * | 11/1858 | Burnham | 16/230 |
| 273,501 | A * | 3/1883 | Forney | 16/230 |
| 710,051 | A * | 9/1902 | Fullam | 16/231 |
| 1,774,330 | A * | 8/1930 | Kaser | 292/335 |
| 2,717,064 | A * | 9/1955 | Hock | 49/394 |
| 3,030,717 | A * | 4/1962 | Lewis | 49/193 |
| 4,371,148 | A * | 2/1983 | Harden | 256/26 |
| 4,884,614 | A * | 12/1989 | Spurling | 160/225 |
| 6,578,827 | B2 * | 6/2003 | McCracken | 256/59 |
| 6,832,752 | B2 * | 12/2004 | Cuzzocrea | 256/25 |
| 6,845,970 | B1 * | 1/2005 | Kenton | 256/73 |
| 7,739,834 | B2 * | 6/2010 | Stoffels et al. | 49/49 |

* cited by examiner

*Primary Examiner* — Katherine Mitchell
*Assistant Examiner* — Marcus Menezes
(74) *Attorney, Agent, or Firm* — Samuel M. Freund; Cochran Freund & Young LLC

(57) ABSTRACT

An enclosure having a gate which may be pivotably hung from stanchions or walls such that it swings in either direction, and may be opened from either side, depending on the assembly of the enclosure, is described. A latch which may be opened from both inside and outside of the enclosure is also described.

8 Claims, 4 Drawing Sheets

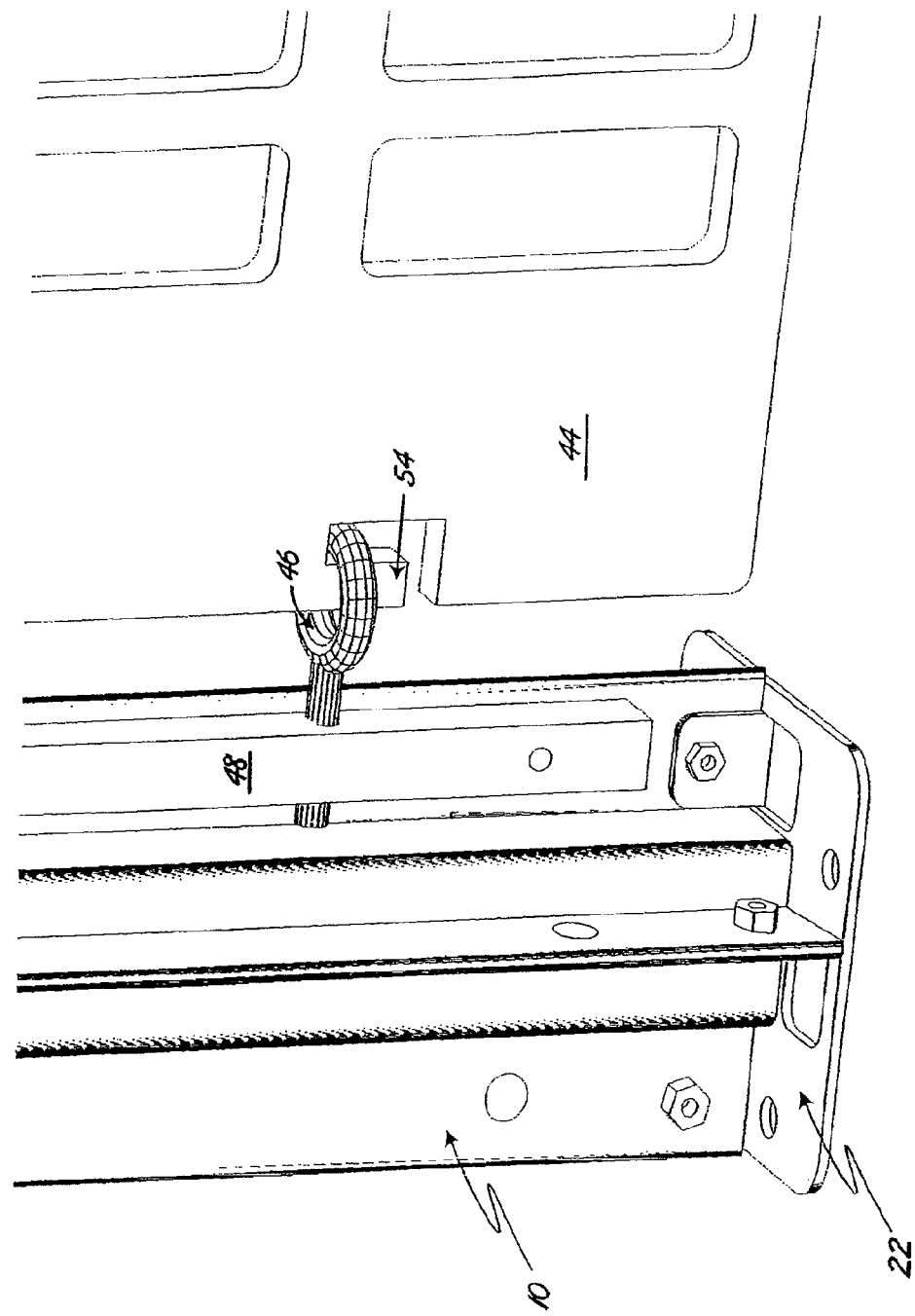

HINGED GATE WITH LATCH

CROSS-REFERENCE TO RELATED APPLICATIONS

The present application claims the benefit of U.S. Provisional Patent Application No. 61/606,550 for "Enclosure Having Ribbed Stanchions" by Joshua A. Robinson et al., which was filed on Mar. 5, 2012, the entire content of which is hereby specifically incorporated by reference herein for all that it discloses and teaches.

FIELD OF THE INVENTION

The present invention relates generally to enclosures and, more particularly, to enclosures gates which may be opened in both directions.

BACKGROUND OF THE INVENTION

Animal enclosures are ubiquitous, and are available in many designs and sizes. Kennel gate latches are generally designed to open from the outside in order to prevent animals from escaping. However, such latches may capture attendants if the kennel entrance closes when the attendant is inside of the kennel. Further, many latch designs do not provide a gate which swings in both directions, and also permit assembly of the kennel such that the gate may be opened from either side.

SUMMARY OF THE INVENTION

Embodiments of the present invention overcome the disadvantages and limitations of prior art by providing an enclosure having a gate which swings in either direction.

Another object of embodiments of the invention is to provide an enclosure which swings in either direction and may be opened from either side.

Still another object of embodiments of the invention is to provide an enclosure having a latch that may be opened both from the inside and the outside of the enclosure.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention as embodied and broadly described herein, the enclosure gate hereof includes: at least one first eyelet attached to a first post or wall; at least one second eyelet attached to a second post or wall; a gate panel member having a first side and a second side, a first flat face and a second flat face, comprising at least one first pin disposed along the first side thereof, wherein the at least one first pin is adapted to slide into the at least one first eyelet; whereby the gate panel member is pivotably attached to the first post or wall; at least one second pin disposed along the second side thereof, wherein the at least one second pin is adapted to slide into the at least one second eyelet; and means for engaging or disengaging the at least one second pin from the at least one second eyelet; whereby the gate panel member is attached to or released from the second post or wall, respectively.

Benefits and advantages of embodiments of the present invention include, but are not limited to, providing an enclosure having a gate panel member which can swing at least 180° in either direction and permit opening the enclosure from either side, depending on the way the enclosure is assembled, and a latch which may be opened both from inside and outside of the enclosure.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 1 is a schematic representation of a side view of a gate panel pivotably attached a post using eyebolts and hinge pins integrally formed in the gate, or otherwise attached thereto.

DETAILED DESCRIPTION OF THE INVENTION

Figure 2A:
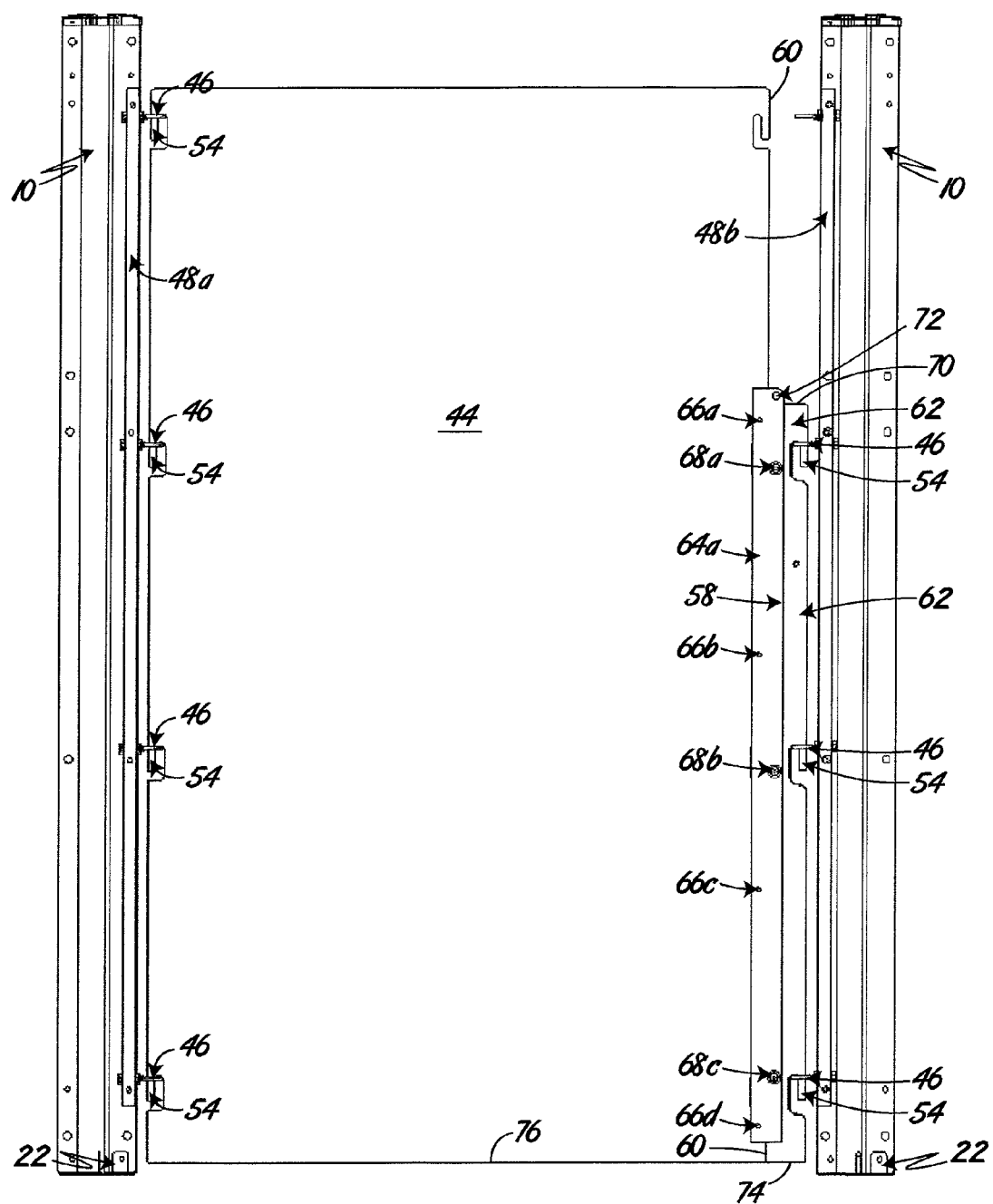
FIG. 2A is a schematic representation of a side view of the swinging gate mounted to a rectangular member on one side thereof, the other side of the gate being mounted by a latching device to a second rectangular member, both rectangular members being attached to vertical posts or walls.

Briefly, embodiments of the present invention include an enclosure having a gate which may be pivotably hung from posts or walls such that it swings in either direction, and may be opened from either side, depending on the assembly of the enclosure. Embodiments of the invention further include a latch which may be opened from both inside and outside of the enclosure.

As used herein, the terms "post" and "stanchion", and "eyelet" and "eyebolt" will be used interchangeably.

Reference will now be made in detail to the present embodiments of the invention, examples of which are illustrated in the accompanying drawings. In the FIGURES, similar structure will be identified using identical reference characters. It will be understood that the FIGURES are for the purpose of describing particular embodiments of the invention and are not intended to limit the invention thereto. Turning now to FIG. 1, a schematic representation of a side view of gate panel, 44, pivotably mounted to rectangular member 48 attached to post, 10, is illustrated. Rectangular members 48 may also be attached to walls or other structures. Post 10 is shown attached to foot, 22, which may be affixed to a ground surface. Hinge pin, 54, integrally formed in gate 44, or otherwise attached thereto, is adapted to be pivotably inserted into eyelet, or eyebolt if a threaded or bolt portion is attached thereto, 46, which is attached to rectangular member 48. Eyelets or eyebolts 46 may be attached to posts 10 in other ways as known in the art, such as welding, as an example. Clearly, at least two eyebolt/hinge pin combinations are required to permit a large gate panel 44 to swing smoothly, while only one combination might be necessary to support a lightweight bar. When used as a pivot, pin 54 performs as a hinge pin. Since gate panel 44 may be constructed from hard plastic material, such as high-density polyethylene, as an example, there are no metal-on-metal parts that will squeak or require lubrication over time. Other materials may also be utilized.

FIG. 2A is a schematic representation of a side view of one face of swinging gate panel 44 pivotably mounted to rectangular member 48a on one side thereof by hinge pins 54, integrally or otherwise formed on one side of the gate member and adapted to fit into eyebolts 46. Latching member, 58, is attached to the other side, 60, of gate panel 44. Elongated slide member, 62, which may be formed from the same material as gate panel 44, has longitudinal slots, 63*a*-63*c*, cut therethrough (FIG. 3), and hinge pins 54 integrally formed therein or otherwise attached thereto, which are adapted to slide into and out of eyebolts 46 mounted in an identical opposing rectangular member 48*b* to that of 48*a* on the other side of gate panel 44, depending on the position of slide member 62. Both rectangular members 48*a* and 48*b* are attached to adjacent posts, or to a post and a wall, if the enclosure is mounted adjacent to a wall. Slide 62 is slidably mounted on gate panel 44 by first elongated flat panel, 64*a*, and opposing, second elongated flat panel, 64*b*, affixed to opposite faces of gate panel 44 (shown in FIG. 2B). First and second flat panels 64*a* and 64*b* sandwich gate panel 44, and are secured thereto using bolts, 66*a*-66*c*. Shoulder bolts or other fasteners, such as rods, as an example, 68*a*-68*c*, between flat panels 64*a*-64*b* are adapted to pass through the longitudinal slots through slide member 62. Together, panels 64a and 64b permit slide 62 to be vertically moved in a downward direction along outside edge 60 of gate 44 by the action of gravity and/or by an attendant pushing down on top portion, 70, of slide member 62, or in an upward direction by an attendant pulling in an upward direction on top portion 70 of slide 62. Gate panel 44 is latched to or unlatched from rectangular member 48 by the action of hinge pins 54 in slide member 62 engaging or disengaging eyebolts 46, respectively. Other means for achieving such engagement and disengagement may be anticipated. Extension, 70, on the uppermost edge of flat panel 64*b* has hole, 72, formed therein or attached thereto. Gate panel 44, may be locked in its closed position by inserting a bolt or lock in hole 72, which prevents slide 62 from being moved in an upward direction. Gate panel 44 may be opened from the other side by simply installing the gate such that latching device 58 is facing eyebolts 46 mounted in rectangular member 48*a*. As stated hereinabove, gate panel 44 is capable of swinging at least 180° in eyebolts 46. Slide 62 and gate panel 44 may be disposed such that the bottom edges thereof, 74, and 76, respectively, are close to the ground, thereby preventing small animals from escaping.

Figure 2B:
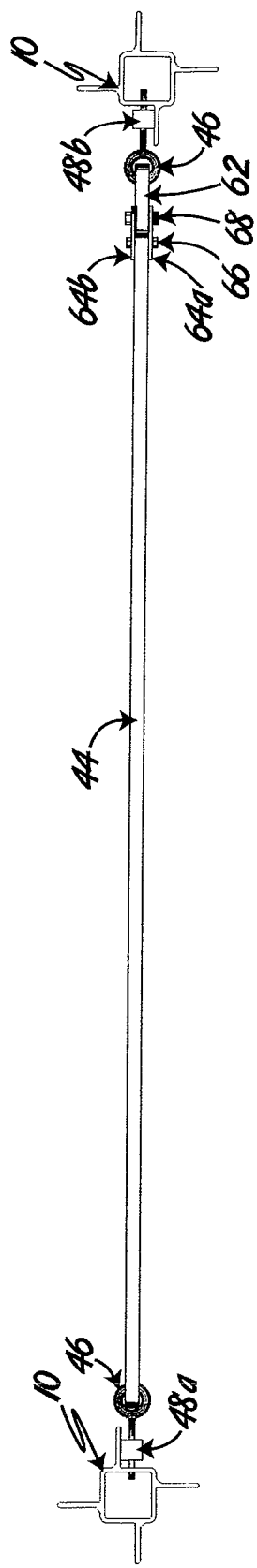
FIG. 2B is a schematic representation of a top view of the swinging gate as illustrated in FIG. 2A, hereof.

FIG. 2B is a schematic representation of a top view of the swinging gate as illustrated in FIG. 2A, hereof.

Figure 3:
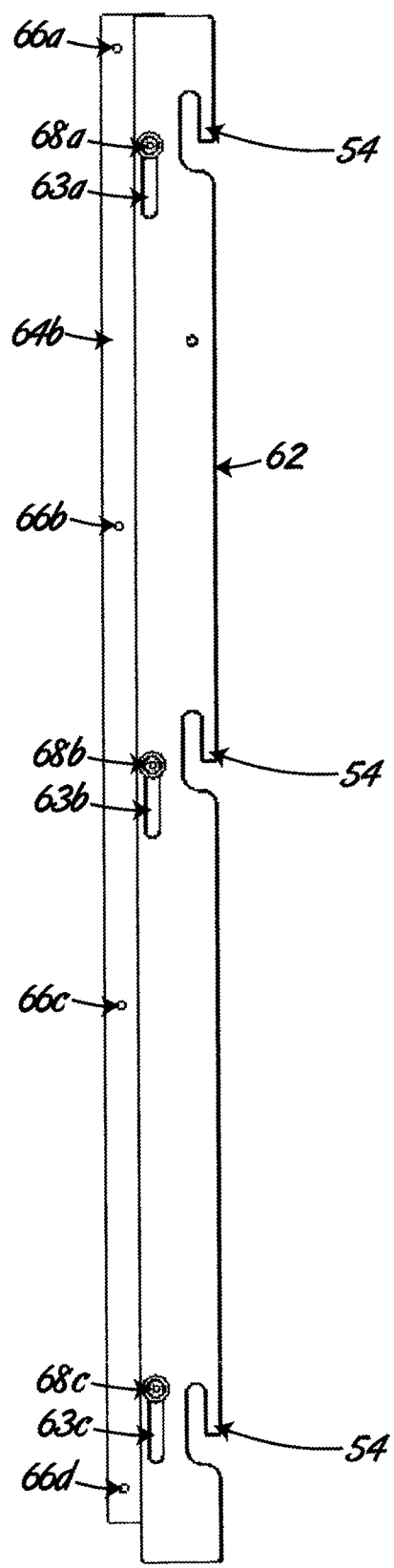
FIG. 3 is a schematic representation of the side view of the slide member of the latching device illustrated in FIG. 2A.

FIG. 3 is a schematic representation of the side view of slide member 62 of latching device 58 illustrated in FIG. 2A, showing longitudinal slots, 63*a*-63*c*, cut therethrough, and a portion of rectangular member 48*b* disposed behind slide member 62.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A hinged gate having a latch, comprising: at least one first eyelet attached to a first post or wall; at least one second eyelet attached to a second post or wall; a gate panel member having a first side and a second side and a first flat face and a second flat face, and comprising at least one first pin disposed along the first side thereof, wherein said at least one first pin is adapted to slide into said at least one first eyelet; whereby said gate panel member is pivotably attached to said first post or wall; and a latch comprising: an elongated slide member having at least one longitudinal slot cut therethrough, a first side and a second side; at least one second pin attached to the first side of said elongated slide member and slidable into and out of said at least one second eyelet, depending on the position of said slide member; a first elongated flat panel and an opposing second elongated flat panel affixed to opposite faces of said gate panel member, and wherein said slide member is slidably sandwiched therebetween; and at least one bolt or rod disposed between said first panel and said second panel and passing through the at least one longitudinal slot for guiding said slide member; whereby said gate panel member is attached to or released from said second post or wall, respectively.

2. The gate of claim 1, wherein the at least one first pin is integrally formed in said gate panel.

3. The gate of claim 1, wherein said gate panel member comprises a plastic material.

4. The gate of claim 3, wherein the plastic material is chosen from polyethylene.

5. The gate of claim 1, wherein the at least one second pin is integrally formed on said slide member.

6. The gate of claim 1, wherein said slide member comprises a plastic material.

7. The gate of claim 6, wherein the plastic material is chosen from polyethylene.

8. The gate of claim 1, wherein one of said first panel or said second panel has a hole near one end thereof, said enclosure further comprising a bolt or lock adapted for passing through the hole for preventing said slide member from being moved such that said at least one second pin is disengaged from said at least one second eyelet.

\* \* \* \* \*